Patented Apr. 17, 1945

2,374,100

UNITED STATES PATENT OFFICE 2,374,100

WATER TREATMENT

Henry A. Jackson, Mount Lebanon, Pa., assignor to Hall Laboratories, Inc., Pittsburgh, Pa., a corporation of Pennsylvania No Drawing. Application May 3, 1937,
Serial No. 140,426

15 Claims. (Cl. 210—23)

The present invention relates to water treatment and especially to water softening and washing. I have found that alkali-metal tripolyphosphates are peculiarly effective and desirable water softeners and detergents, and that they may be advantageously employed in the methods and compositions hereinafter more specifically described and claimed. The alkali-metal tripolyphosphates are chemical compounds of the formula $M_5P_3O_{10}$ in their anhydrous form. Sodium tripolyphosphate is the most common and important of the alkali-metal tripolyphosphates. When a material having the nominal composition $Na_5P_3O_{10}$ and which may be a mixture of approximately 28 parts sodium metaphosphate and 72 parts sodium pyrophosphate is thoroughly fused and then slowly cooled a crystalline compound is formed which chemical and X-ray analyses show to be a definite chemical compound, sodium tripolyphosphate. If the fusion is rapidly cooled it solidifies into a glassy amorphous mass which, although having the nominal composition $Na_5P_3O_{10}$, does not exhibit the characteristics of a definite chemical compound like the crystals, and which may be considered to be a fused mixture of sodium metaphosphate and sodium pyrophosphate. This glassy mass may be converted by annealing into the crystalline composition which is sodium tripolyphosphate. Sodium tripolyphosphate forms a crystalline hydrate of the general formula $Na_5P_3O_{10}.6H_2O$. Sodium tripolyphosphate is colorless, appearing white in the granulated form, which is free flowing. By suitable precautions it may be produced in a mass which readily disintegrates into its constituent fine crystals. Sodium tripolyphosphate is not deliquescent and particularly in its hydrated form may be preserved indefinitely in ordinary atmospheres without caking or picking up moisture. Sodium tripolyphosphate is readily water-soluble. In moderately dilute water solutions, say of about 0.5%, it produces a mildly alkaline solution of a pH value of approximately 9.8, which is definitely more stable than solutions of hexametaphosphate.

Sodium tripolyphosphate softens calcium-containing hard waters by combining with the calcium to form calcium-containing water-soluble complexes from which the calcium is but very slightly ionized. By sequestering the calcium in a soluble but slightly ionized condition, the water is softened without the formation of a precipitate and remains crystal clear. The calcium is much less ionized from the calcium-containing complex formed from the sodium tripolyphosphate than from a calcium fatty acid soap, so that sodium tripolyphosphate may be used completely to soften the water against soap. About 1.2 lb. of sodium tripolyphosphate softens against soap a quantity of hard water containing one thousand grains of hardness. In fact, the ionization of calcium from such complex is even less than that from calcium carbonate, so that a sodium tripolyphosphate solution will actualy dissolve calcium carbonate.

The addition of the proper amount of sodium tripolyphosphate to a calcium-containing water prevents the formation of an insoluble calcium soap upon the addition of soap to the water. It also prevents the precipitation of calcium compounds from a bicarbonate water when such water is heated or has alkali added thereto. The tripolyphosphate may be employed for treating water in any place where it is desired to decrease the free ion concentration of the calcium.

Crystalline sodium tripolyphosphate is more effective in sequestering calcium in a water soluble complex than is the glassy product of the same over-all composition $Na_5P_3O_{10}$ obtained by rapid cooling from the melt. The glassy mass resulting from rapid cooling of a fusion having the nominal composition $Na_5P_3O_{10}$ has been considered to be a mixture of sodium metaphosphate and sodium pyrophosphate. It exhibits the properties of such a mixture, as contrasted with the properties of a definite chemical compound which are characteristic of the crystals.

Calcium is the principal precipitate-forming alkaline earth metal in most hard waters, although it is frequently accompanied with magnesium and for convenience, the expression "alkaline earth metals" is use as inclusive of magnesium as well as calcium. The alkali-metal tripolyphosphates form soluble slightly ionized compounds with magnesium, reducing its free-ion concentration in the same way as they reduce the free-ion concentration of calcium. Any hardness due to magnesium is overcome in the same way as the calcium hardness by the addition of the requisite amount of the tripolyphosphate. Ordinarily the tripolyphosphate is added until the particular water in question is shown to be soft by the soap test, indicating that the proper amount of tripolyphosphate has been added to sequester all of the insoluble soap-forming metal ions.

I have prepared sodium tripolyphosphate by the reaction of hydrated disodium orthophosphate with ammonium nitrate by heating equal molar proportions of the orthophosphate and nitrate to a temperature of approximately 280° C. and maintaining the mixture at this temperature for approximately 60 hours. The product from this reaction was a white crystalline mass which was dissolved in water and filtered to remove a small amount of solid residue. From this solution I precipitated a hydrated crystalline product by the addition of 10 parts by volume of methyl alcohol to 85 parts by volume of the solution. The crystalline precipitate was filtered off and washed with progressively increasing concentrations of methyl alcohol and dried.

It is my belief that during this reaction a portion of the sodium initially present in combined form in the disodium orthophosphate is combined with a part of the nitrate radical initially present in the ammonium nitrate to produce sodium nitrate, thus decreasing the amount of sodium remaining in combination with the phosphorus in the mixture. Depending upon such factors as the rate and duration of heating, more or less sodium nitrate may be formed. Any ammonium nitrate not reacting to form sodium nitrate is gradually decomposed into volatile substances and lost. The reaction product will usually comprise sodium tripolyphosphate, sodium metaphosphate and sodium nitrate. When the reaction product is added to water, the sodium tripolyphosphate and the sodium nitrate dissolve readily, but as a result of the low temperature of preparation at least part of the sodium metaphosphate usually is present in a relatively insoluble form. Upon addition of alcohol to the solution, sodium tripolyphosphate and sodium metaphosphate are thrown out of solution while sodium nitrate remains in solution due to its relatively greater solubility in the solution of water and alcohol. By controlling the concentration of the solution and the amount of alcohol added, it is possible to prepare a substantially pure crystalline hydrated sodium tripolyphosphate.

The use of ammonium nitrate and methyl alcohol is not desirable in commercial operation because of the expense of these reagents, and therefore for commercial production I prefer to prepare sodium tripolyphosphate by using sodium carbonate and phosphoric acid, or mixtures of acid orthophosphates.

Suitable quantities of sodium carbonate and phosphoric acid to yield a molar ratio of 5 to 3 between $Na_2O$ and $P_2O_5$ may be heated in a suitable furnace until the water formed by the reaction of the sodium carbonate and phosphoric acid, together with any water of crystallization, is driven off. The mixture at temperatures somewhat in excess of 750° C. is pasty and may be poured from the furnace into molds or onto a casting wheel. The fluidity of the mixture is increased by increasing the temperature and at 860° C. it will be entirely fluid and contain no solid component. At temperatures in excess of 610° C. and below those of complete fluidity, the solid phase is crystalline anhydrous sodium pyrophosphate. As the temperature decreases toward 610° C., the amount of the solid phase of sodium pyrophosphate crystals increases until the mass becomes quite thick and mushy.

If the mixture is heated about 860° C., which is above the temperature at which solid sodium pyrophosphate can exist, the mixture is completely fluid, and upon very rapid chilling it becomes a supercooled liquid which may be termed sodium tripolyphosphate in non-crystalline glassy form. In order to obtain such glassy form, the fluid mass must be cast in thin layers against cold surfaces so that it is supercooled in liquid form before there is an opportunity for the formation of pyrophosphate crystals. Upon annealing, the glassy mass may be converted into crystalline form.

I prefer, however, to form the crystalline tripolyphosphate by slow cooling of the fluid or pasty mixture. If the reaction mixture is heated to a temperature between 610° C. and 860° C. a more or less pasty mass, depending upon the temperature, is formed containing crystals of sodium pyrophosphate in a molten mass. If the mass is heated above 860° C. and slowly cooled, the same type of mass is formed, namely, sodium pyrophosphate crystals in the molten matrix. The proportion of sodium pyrophosphate crystals increases as the temperature decreases toward 610° C. As the temperature is decreased below about 610° C., which is the peritectic or incongruent melting point of the sodium tripolyphosphate, the sodium pyrophosphate crystals disappear and crystals of sodium tripolyphosphate appear. If the mass is allowed to cool rapidly to appreciably below 610° C., the pyrophosphate crystals will be trapped and the resultant solid will contain pyrophosphate crystals in amount depending upon the rapidity of the cooling. Corresponding to the amount of pyrophosphate left in the mixture, there will be an equivalent amount of metaphosphate which will usually be in the form of the hexametaphosphate. On the other hand, if the mass is cooled slowly from about 610° C., the pyrophosphate crystals will entirely disappear and the mass will solidify as sodium tripolyphosphate in anhydrous crystalline form.

The mass may, for example, be cooled slowly from 610° C. to 550° C. in about one-half an hour's time, which will result in the formation of a solid consisting of tripolyphosphate crystals, or the mass may be held at about 600° C. for about one-half hour, in which case sodium pyrophosphate crystals will disappear and the mass will go completely solid as sodium tripolyphosphate crystals. After the complete conversion of the mass to sodium tripolyphosphate crystals, the cooling thereafter may be rapid.

The mass of tripolyphosphate crystals thus prepared is readily disintegrable into a fine crystalline powder.

Instead of phosphoric acid and sodium carbonate, I may use as starting ingredients phosphoric pentoxide and sodium hydroxide, or I may use a mixture of monosodium orthophosphate and disodium orthophosphate, or I may use a mixture of sodium metaphosphate and sodium pyrophosphate, or other suitable soda base and source of $P_2O_5$. In each case the proportions of the mixture are so chosen that the molar ratio between $Na_2O$ and $P_2O_5$ is as 5 to 3 if a pure sodium tripolyphosphate is to be obtained.

Sodium tripolyphosphate may also be prepared by heating to reaction temperatures below 540° C. a mixture of hydrated monosodium orthophosphate and hydrated disodium orthophosphate. This mixture when heated melts in its water of crystallization and if maintained at a temperature of about 500° C. will lose substantially all of its water, becoming a white crystalline mass, which upon cooling likewise readily disintegrates into a fine white powder consisting of crystalline sodium tripolyphosphate. In this reaction the sodium tripolyphosphate appears to be formed directly without the production of pyrophosphate crystals, and therefore precautions do not have to be taken to cool the mass slowly.

The anhydrous crystalline tripolyphosphate as thus produced is not deliquescent and does not become moist when exposed to atmospheres of ordinary humidity, although it may take up some water as water of crystallization and show some tendency to cake. For most purposes the anhydrous crystalline form is satisfactory for use. However, if it is desired to use the hydrated crystals to insure freedom from caking, the anhydrous crystals may be dissolved in water and the hydrated crystals precipitated therefrom.

The action of the sodium tripolyphosphate in softening water and as a detergent is similar to that of sodium hexametaphosphate or Graham's salt. Under most conditions it requires more of the sodium tripolyphosphate than of sodium hexametaphosphate to produce the same degree of calcium sequestration. However, despite its somewhat lower efficiency, the tripolyphosphates have certain advantages over the hexametaphosphates.

Sodium tripolyphosphate in itself produces a somewhat alkaline solution and does not require the addition of alkaline reagents, as does sodium hexametaphosphate when used for washing and detergent purposes. The sodium tripolyphosphate produces a mildly alkaline water solution of a pH value of about 9.8, which substantially coincides with the pH value of solutions of neutral sodium oleate soaps and high-grade toilet soaps which have a pH value of approximately 9.8. The sodium tripolyphosphate can, therefore, be used without materially changing the pH value of the soap solution. Thus it does not diminish the detergent action of the soap by decreasing the alkalinity of the soap solution, nor does it irritate the skin by increasing the alkalinity of the solution above that of a good soap.

The sodium tripolyphosphate does not have the disadvantage of the deliquescent properties of sodium hexametaphosphate. Sodium tripolyphosphate does not require the quick cooling necessary in the production of hexametaphosphate or Graham's salt, which is necessary to prevent the formation of the crystalline trimetaphosphate, which is substantially ineffective as a water softener. The tripolyphosphate is the most effective crystalline phosphate water softener.

In alkaline solutions or in heated solutions, and particularly in highly heated, strongly alkaline solutions, sodium tripolyphosphate has the advantage of greater stability than sodium hexametaphosphate, which under such conditions tends to rehydrate to the pyro or ortho condition. Sodium tripolyphosphate may, therefore, be advantageously employed for such purposes as mechanical dish washing, kier boiling, bottle washing, metal cleansing, and in general where highly heated, strongly alkaline solutions are employed, although it may be employed for water softening purposes in general where ordinary temperatures and lower alkalinities are encountered. It may be employed as a washing compound for mechanical dish washing and like purposes as a mixture with a highly alkaline deflocculative detergent capable of peptizing greases such, for example, as sodium metasilicate, sodium hydroxide, sodium carbonate, or a strong soap.

I prefer to use the sodium tripolyphosphate as a water-softening composition substantially pure or containing but minor proportions of other ingredients. However, sodium tripolyphosphate may be mixed with other substances, for example, a water-softening compound may be formed by a mixture of sodium tripolyphosphate and sodium hexametaphosphate in which each contributes to the water softening, although if the sodium hexametaphosphate is used in a considerable amount, the mixture will tend to be deliquescent. Therefore, in making such mixtures I prefer to have the sodium tripolyphosphate the essential or principal constituent. Such mixture may be prepared by heating suitable quantities of sodium carbonate and phosphoric acid to yield a molar ratio of somewhat less than 5 to 3 between $Na_2O$ and $P_2O_5$, and calculated to produce sodium tripolyphosphate $Na_5P_3O_{10}$ and a predetermined minor proportion of sodium metaphosphate $NaPO_3$. Such mixtures may be heated as before described to a temperature in excess of 610° C., preferably to 700 or 800° C. If the mixture is heated above 860° C. and quickly chilled, it will consist of a glassy mass. On the other hand, if the mixture is slowly cooled toward 610° C., a solid phase of sodium pyrophosphate crystals will be formed in a molten matrix. If this mass is cooled too quickly through the range immediately below 610° C., the pyrophosphate crystals will be trapped as such, which is undesirable. The mixture therefore should be cooled slowly enough through and below 610° C., as pointed out above, to permit the re-solution of the sodium pyrophosphate crystals and the formation of sodium tripolyphosphate crystals. The cooling, however, should be rapid enough so that the metaphosphate will solidify in the glassy hexametaphosphate form and not in the crystalline trimetaphosphate form. Ordinarily, cooling of the mass from 610° C. to room temperature in about an hour produces a resultant mass consisting principally of tripolyphosphate crystals and glassy hexametaphosphate as a matrix.

In making such mixture precautions are preferably taken so that the product is partially glassy since it is only in the glassy form that sodium metaphosphate is effective in suppressing the precipitation of calcium. The mixtures of sodium tripolyphosphate with a minor amount of sodium hexamethaphosphate may be produced in other ways as variations of the processes described above in the making of substantially pure sodium tripolyphosphate. The acid orthophosphates, mixtures of sodium metaphosphate and sodium pyrophosphate, or other suitable sources of soda base and $P_2O_5$ may be used as starting materials, precautions being taken so that crystals of sodium tripolyphosphate are formed instead of crystals of sodium pyrophosphate, which is not effective as a water softener, and so that the metaphosphate will be produced as the non-crystalline or glassy hexametaphosphate and not as the crystalline trimetaphosphate, which is not effective as a water softener.

In preparing such mixtures of tripolyphosphate and sodium hexametaphosphate, it is preferred that the mixture contain at least 85 per cent tripolyphosphate and not more than 15 per cent metaphosphate, since a larger proportion of sodium hexametaphosphate will tend to make the mixture too deliquescent. Also if more of the hexametaphosphate is employed in the mixture, the pH value will be too greatly reduced.

If desired, sodium pyrophosphate may be mixed with sodium tripolyphosphate, which increases the alkalinity of the mixture but decrease its water-softening properties. The sodium tripolyphosphate may be mixed, if desired, with other materials such as various detergents or other compounding materials.

While the invention has been described with particular reference to sodium tripolyphosphate, tripolyphosphates of the other alkali-metals may be employed, such as potassium tripolyphosphate, lithium triployphosphate, and ammonium tripolyphosphate, as they are water-soluble and effective in repressing the calcium.

While I have specifically described the preferred embodiment of my invention, it is to be understood that the invention may be otherwise embodied and practiced within the scope of the following claims.

I claim:

1. The process of softening water containing an alkaline-earth metal compound, which comprises adding thereto crystalline alkali-metal tripolyphosphate in an amount sufficient effectively to sequester the alkaline-earth metal in a but slightly ionized condition.

2. The process of softening calcium-containing waters, which comprises adding thereto crystalline alkali-metal tripolyphosphate in an amount sufficient to reduce the calcium ion concentration below that in equilibrium with the solid phase of its fatty acid soap.

3. The process of softening water containing an alkaline-earth metal compound, which comprises adding thereto a water-softening mixture consisting principally of crystalline alkali-metal tripolyphosphate and an effective amount but not more than about 15% of a water-soluble alkali-metal metaphosphate, in an amount sufficient effectively to sequester the alkaline-earth metal in a but slightly ionized condition.

4. A water-softening compound consisting principally of crystalline alkali-metal tripolyphosphate.

5. A water-softening compound containing sufficient crystalline sodium tripolyphosphate to impart to water in a moderately dilute solution a pH value approximately that of a neutral sodium oleate soap in a moderately dilute solution.

6. A water-softening compound consisting principally of crystalline alkali-metal tripolyphosphate and containing a substantial amount but not more than about 15% of a water-soluble alkali-metal metaphosphate.

7. The process of washing which comprises adding to the wash water a detergent which is not resistant to lime and which precipitates calcium compounds from hard water, and crystalline alkali-metal tripolyphosphate which prevents such precipitation, and washing the materials to be cleansed with the water so treated.

8. The process of washing which comprises adding to the wash water a fatty acid soap and crystalline alkali-metal tripolyphosphate, and washing the materials to be cleansed with the water so treated.

9. A washing compound consisting principally of crystalline alkali-metal tripolyphosphate and a highly alkaline deflocculative detergent capable of peptizing greases.

10. A washing compound consisting principally of crystalline alkali-metal tripolyphosphate and a fatty acid soap.

11. The process of softening water containing an alkaline earth metal compound, which comprises adding thereto crystalline sodium tripolyphosphate in an amount sufficient effectively to sequester the alkaline earth metal in a but slightly ionized condition.

12. A water softening compound consisting principally of crystalline sodium tripolyphosphate.

13. The process of washing which comprises adding to the wash water a fatty acid soap and crystalline sodium tripolyphosphate, and washing the material to be cleansed with the water so treated.

14. A washing compound consisting principally of crystalline sodium tripolyphosphate and a highly alkaline deflocculative detergent capable of peptizing greases.

15. A washing compound consisting principally of crystalline sodium tripolyphosphate and a fatty acid soap.

HENRY A. JACKSON.